(12) United States Patent
Feng et al.

(10) Patent No.: US 7,357,875 B2
(45) Date of Patent: Apr. 15, 2008

(54) HYBRID COATING FOR MAGNETIC HEADS

(75) Inventors: Zhu Feng, Pleasanton, CA (US); Ellis Cha, San Ramon, CA (US)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 0 days.

(21) Appl. No.: 11/399,124

(22) Filed: Apr. 6, 2006

(65) Prior Publication Data
US 2006/0177570 A1 Aug. 10, 2006

Related U.S. Application Data

(62) Division of application No. 10/434,949, filed on May 8, 2003.

(51) Int. Cl.
*B44C 1/22* (2006.01)
(52) U.S. Cl. .............................. 216/22; 216/23; 216/91
(58) Field of Classification Search .................. 216/22, 216/23, 91
See application file for complete search history.

(56) References Cited

U.S. PATENT DOCUMENTS

| | | | |
|---|---|---|---|
| 4,327,387 A | 4/1982 | Plotto | 360/103 |
| 4,992,300 A | 2/1991 | Ogawa et al. | 427/44 |
| 5,271,802 A | 12/1993 | Chang et al. | 156/643 |
| 5,425,988 A | 6/1995 | Ogawa et al. | 428/333 |
| 6,479,111 B2 | 11/2002 | Dykes et al. | 427/595 |
| 6,586,069 B2 | 7/2003 | Dykes et al. | 428/65.3 |
| 6,743,481 B2 | 6/2004 | Hoehn et al. | 427/384 |
| 6,822,833 B2* | 11/2004 | Yang et al. | 360/126 |
| 2003/0099069 A1 | 5/2003 | Kagami et al. | 360/313 |
| 2003/0133227 A1 | 7/2003 | Anan et al. | 360/236.3 |
| 2004/0156145 A1 | 8/2004 | Koishi | 360/235.8 |
| 2004/0201926 A1 | 10/2004 | Hancer et al. | 360/294.4 |
| 2004/0203256 A1* | 10/2004 | Yang et al. | 438/780 |
| 2004/0223262 A1 | 11/2004 | Feng et al. | 360/235.1 |

FOREIGN PATENT DOCUMENTS

JP 09-120525 6/1997

OTHER PUBLICATIONS

Furuichi et al.; JP2001043650 A Feb. 2001, Japan.*

* cited by examiner

*Primary Examiner*—Binh X. Tran
(74) *Attorney, Agent, or Firm*—Kenyon & Kenyon LLP (57) ABSTRACT

A system and method for providing corrosion protection for a magnetic read/write head is disclosed. A monolayer surface coating is applied to cover those portions of the under layer of a magnetic read/write head not already covered by a previously applied diamond-like coating. This allows for a thinner diamond like coating than previously applied in the art. The monolayer surface coating can be a self-assembled monolayer, such as an organosilicon for hydroxylated surfaces or carboxylic acids for aluminum or other metal oxides. Alternatively, the monolayer surface coating can be directly applied to the under layer with no diamond-like coating being present. The monolayer surface coating can be applied by a surface immersion process or by a vacuum coating process.

8 Claims, 7 Drawing Sheets

HYBRID COATING FOR MAGNETIC HEADS

RELATED APPLICATIONS

This application is a Divisional of patent application Ser. No. 10/434,949, filed on May 8, 2003.

BACKGROUND INFORMATION

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few nanometers above the surface of the rotating disk. The flying height of the slider is viewed as one of the most critical parameters affecting the magnetic disk reading and recording capabilities of a mounted read/write element. A relatively small flying height allows the transducer to achieve greater resolution between different data bit locations on the disk surface, thus improving data density and storage capacity. With the increasing popularity of lightweight and compact notebook type computers that utilize relatively small yet powerful disk drives, the need for a progressively lower flying height has continually grown.

Figure 1:
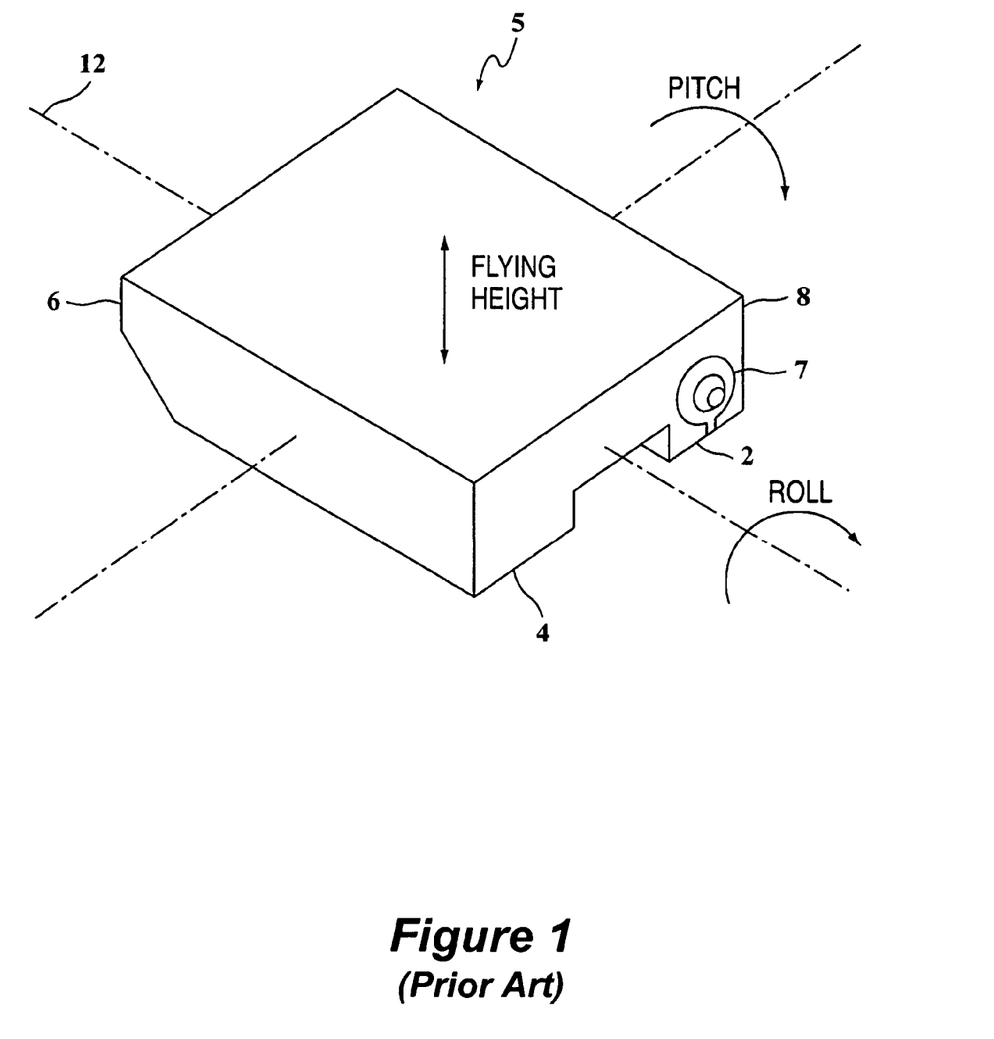
FIG. 1 is a perspective view of a slider device with a read/write head that is known in the art.

As shown in FIG. 1 an ABS design known for a common catamaran slider 5 may be formed with a pair of parallel rails 2 and 4 that extend along the outer edges of the slider surface facing the disk. Other ABS configurations including three or more additional rails, with various surface areas and geometries, have also been developed. The two rails 2 and 4 typically run along at least a portion of the slider body length from the leading edge 6 to the trailing edge 8. The leading edge 6 is defined as the edge of the slider that the rotating disk passes before running the length of the slider 5 towards a trailing edge 8. As shown, the leading edge 6 may be tapered despite the large undesirable tolerance typically associated with this machining process. The transducer or magnetic element 7 is typically mounted at some location along the trailing edge 8 of the slider as shown in FIG. 1. The rails 2 and 4 form an air bearing surface on which the slider flies, and provide the necessary lift upon contact with the air flow created by the spinning disk. As the disk rotates, the generated wind or air flow runs along underneath, and in between, the catamaran slider rails 2 and 4. As the air flow passes beneath the rails 2 and 4, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails 2 and 4, the large surface area of the slider body 5 would produce an excessively large air bearing surface area. In general, as the air bearing surface area increases, the amount of lift created is also increased. Without rails, the slider would therefore fly too far from the rotating disk thereby foregoing all of the described benefits of having a low flying height.

Figure 2:
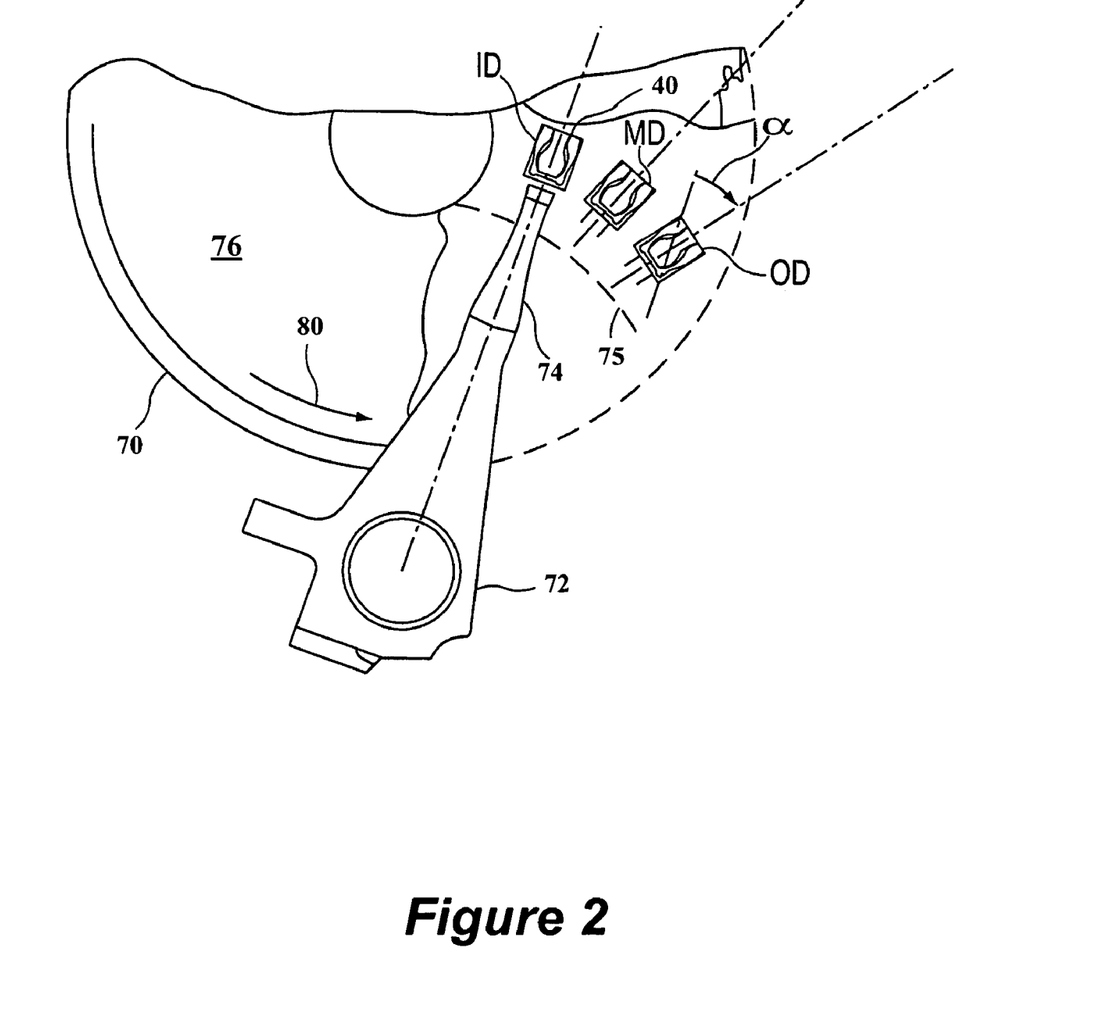
FIG. 2 is a perspective view of a disk drive device that is know in the art.

As illustrated in FIG. 2, a head gimbal assembly 40 often provides the slider with multiple degrees of freedom such as vertical spacing, or pitch angle and roll angle which describe the flying height of the slider. As shown in FIG. 2, a suspension 74 holds the HGA 40 over the moving disk 76 (having edge 70) and moving in the direction indicated by arrow 80. In operation of the disk drive shown in FIG. 2, an actuator 72 (such as a voice-coil motor (VCM)) moves the HGA over various diameters of the disk 76 (e.g., inner diameter (ID), middle diameter (MD) and outer diameter (OD)) over arc 75.

Reducing head-disk spacing requires reduction of pole-tip recession and the thickness of the protective layer on the slider. This protective layer, which can take the form of a diamond-like carbon (DLC) coating, protects magnetic materials from corrosion and mechanical wear (e.g., caused by contact between the slider and the recording disk). When the DLC coating gets very thin, uniform coverage of DLC on the magnetic material become a problem due to the presence of pinholes in the DLC coating, surface roughness and contaminants on substrate. The thin DLC coating may become ineffective in preventing corrosion and mechanical wear.

In view of the above, there is a need for an improved method and system for coating a magnetic head.

DETAILED DESCRIPTION

A system and method for providing corrosion protection for a magnetic read/write head is disclosed. In one embodiment, a monolayer surface coating is applied to cover those portions of the under layer of a magnetic read/write head not already covered by a previously applied diamond-like coating. This allows for a thinner diamond like coating than previously applied in the art. In one embodiment, the monolayer surface coating can be a self-assembled monolayer, such as an organosilicon (e.g. alkyl trichlorosilane, fluorinated alkyl trichlorosilane, alkyl trialkyloxysilane, fluorinated alkyl trialkyloxysilane, etc.) for hydroxylated surfaces (e.g. SiOx, $Al_2O_3$, glass, etc.) or carboxylic acids (e.g. alkyl carboxylic acids, fluorinated alkyl carboxylic acids, etc.) for aluminum or metal oxides. Alternatively, the monolayer surface coating can be directly applied to the under layer with no diamond-like coating being present. The monolayer surface coating can be applied, for example, by a liquid immersion process, by a vapor coating process, etc.

Figure 3:
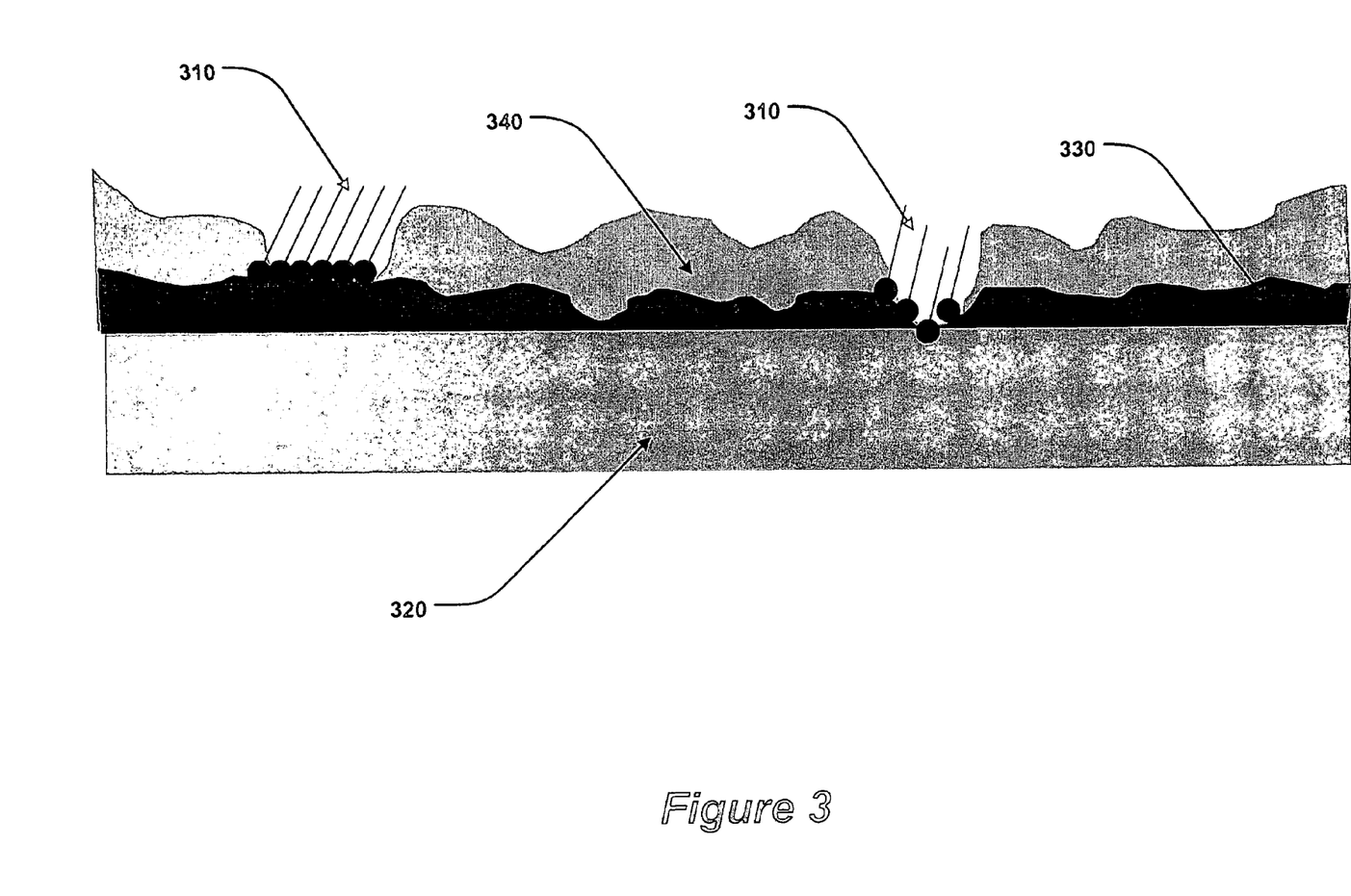
FIG. 3 provides an illustration of a monolayer coating as applied to an under layer of a magnetic read/write head according to an embodiment of the present invention.

FIG. 3 illustrates one embodiment of a monolayer coating as applied to a magnetic read/write head. In one embodiment, a monolayer surface coating 310 is applied so as to at least partially cover an under layer of the magnetic read/write head. In one embodiment, the under layer may include a magnetic layer 320 covered by a silicon or oxide layer 330. In one embodiment, a diamond-like carbon (DLC) coating 340 is applied to the under layer, with the monolayer surface coating covering those portions of the under layer not covered by the DLC. In a further embodiment, the DLC has a thickness of less than 50 angstroms. The monolayer surface coating 310 bonds strongly with the silicon or oxide layer 330 but bonds weakly with the DLC 340. Due to its weak bonding to DLC surface, the surface coating will be easily removed through subsequent cleaning. The cleaning may be performed by using either organic solvents or mechanical rubbing with cloths. The surface coating should not add additional thickness to magnetic spacing while still providing protection against corrosion, staying in the uncovered oxide areas.

In a further embodiment in which no DLC 340 is applied to the silicon or oxide layer 330, the monolayer surface coating 340 is applied directly to the silicon or oxide layer 330. Since the surface coating thickness may be controlled to around 1 nanometer or less in molecular length, the actual magnetic spacing may therefore be reduced accordingly.

In one embodiment, the type of monolayer surface coating used has strong adhesion to oxide surfaces, weak adhesion to DLC surfaces, high packing density, and high hydrophobicity. Examples of materials that may be used as a monolayer surface coating include self-assembled monolayers such as an organosilicon (e.g. alkyl trichlorosilane, fluorinated alkyl trichlorosilane, fluorinated alkyl trialkyloxysilane, etc.) for hydroxylated surfaces (e.g. SiOx, $Al_2O_3$, glass, etc.) or carboxylic acids (e.g. alkyl carboxylic acids, fluorinated alkyl carboxylic acids, etc.) for aluminum or metal oxides.

EXAMPLE 1

Figure 4:
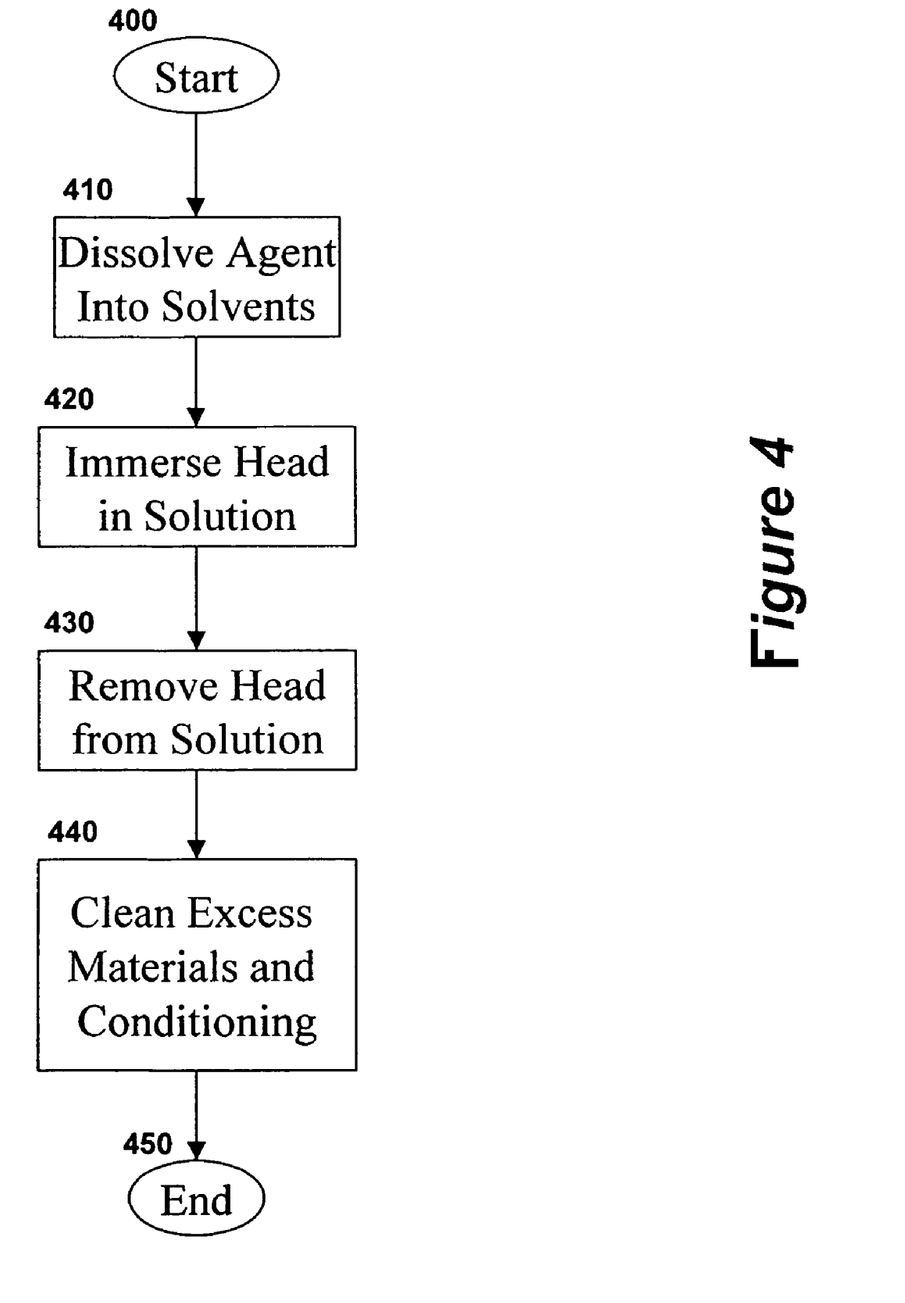
FIG. 4 provides a flowchart illustrating a liquid process for attaching the monolayer coating according to an embodiment of the present invention.
Figure 5:
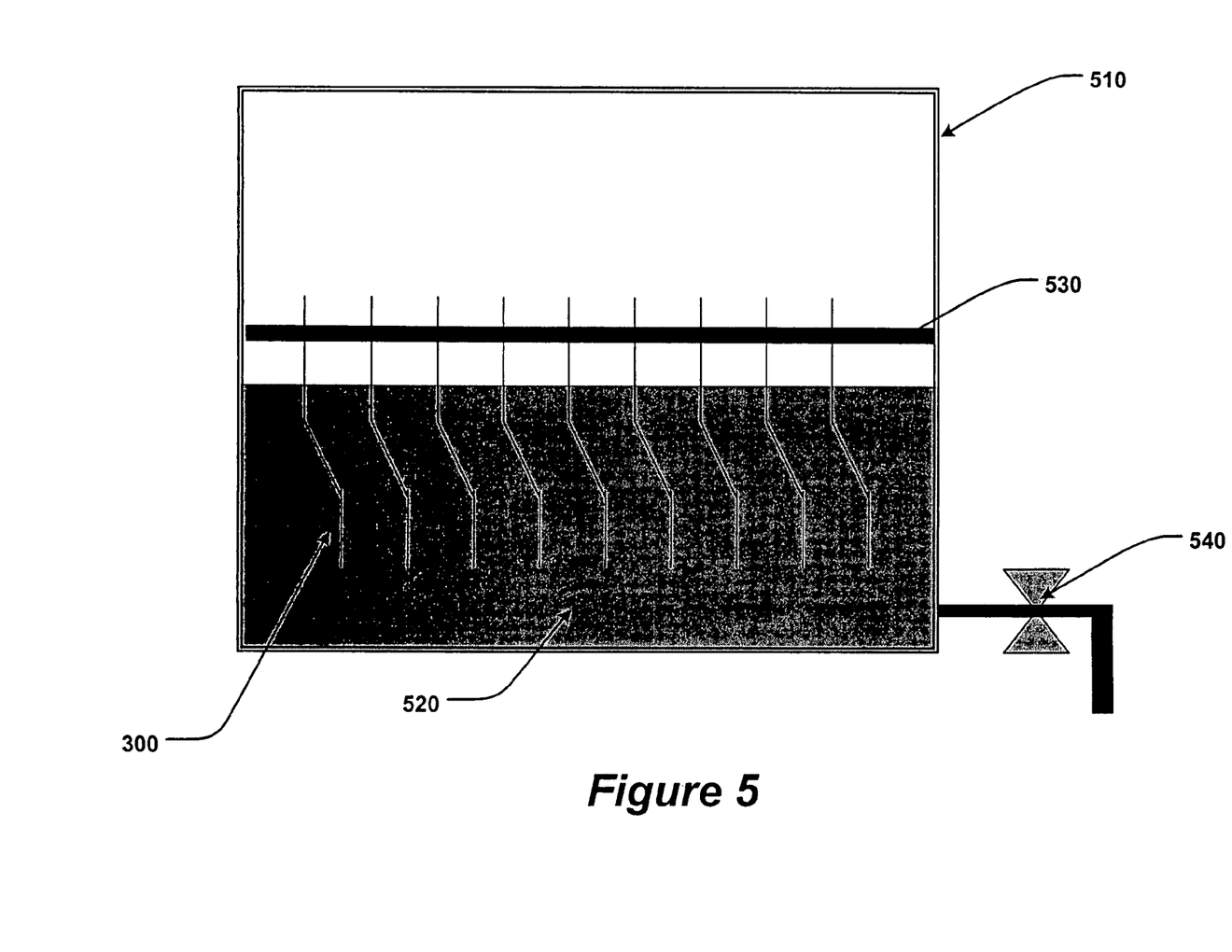
FIG. 5 provides a schematic diagram of a system for coating magnetic heads with monolayer materials in a liquid process according to an embodiment of the present invention.

In one embodiment of the present invention, a liquid process is provided for applying the monolayer surface coating to the magnetic head and is illustrated in the flowchart of FIG. 4 using the system of FIG. 5. The process starts (Block 400) by dissolving a monolayer agent into a container 510 filled with solvents (Block 410). In this example, the monolayer agent is Perfluoro-decyl trichlorosilane (PFTDS) dissolved into a solvent of 2,2,4-Trimethyl Pentane in a ratio of 1/100 to 1/200 by volume to form a monolayer solution 520 at room temperature. The magnetic read/write head 300 with an underlayer and DLC layer as described above is hung from a rack 530 and immersed into the monolayer solution 520 (Block 420). After 10 minutes, the magnetic read/write head 300 is removed from the monolayer solution 520 by draining the monolayer solution 530 out through a bottom drain 540 (Block 430). Excess coating materials and coating conditioning are cleaned off of the head using a solvent, such as 2,2,4-Trimethyl Pentane (Block 440), ending the process (Block 450).

EXAMPLE 2

Figure 6:
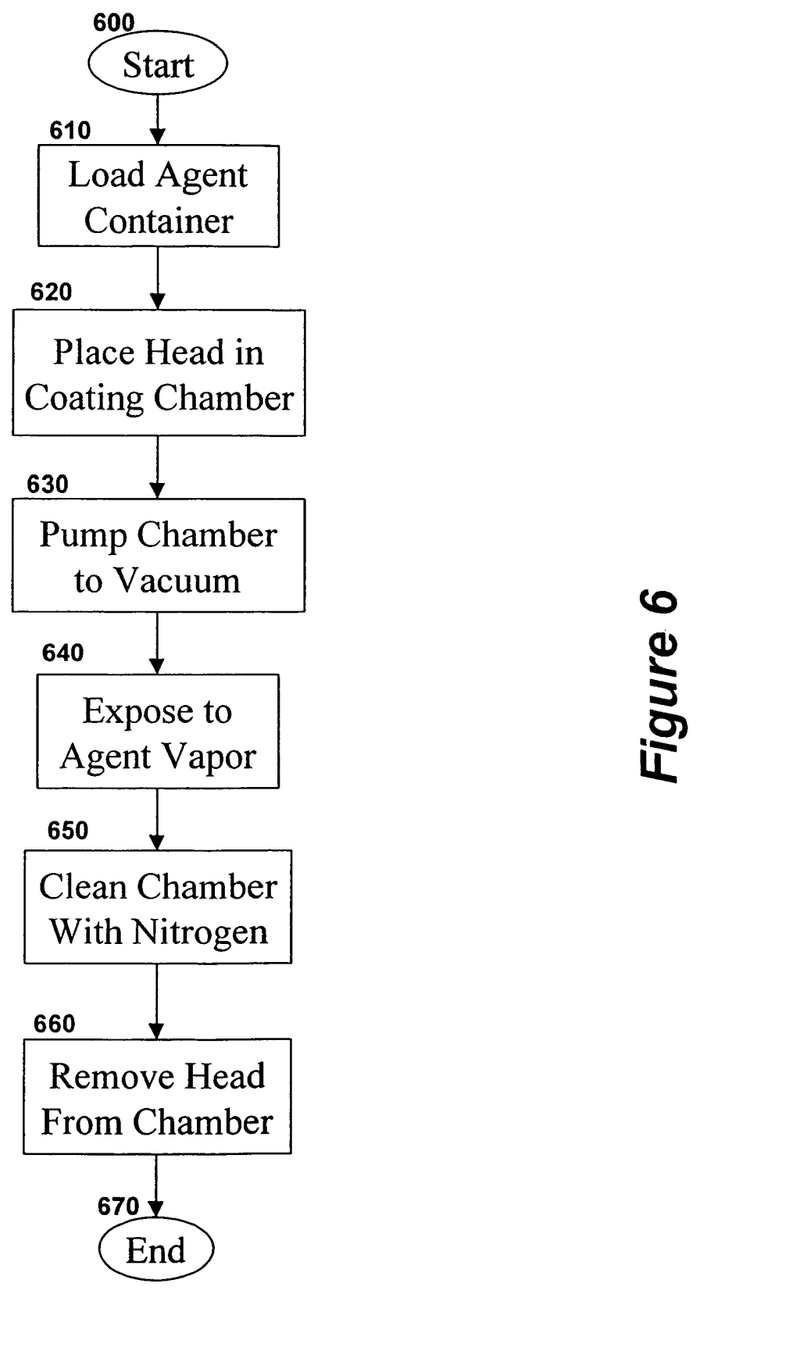
FIG. 6 provides a flowchart illustrating a vacuum process for attaching the monolayer coating according to an embodiment of the present invention.
Figure 7:
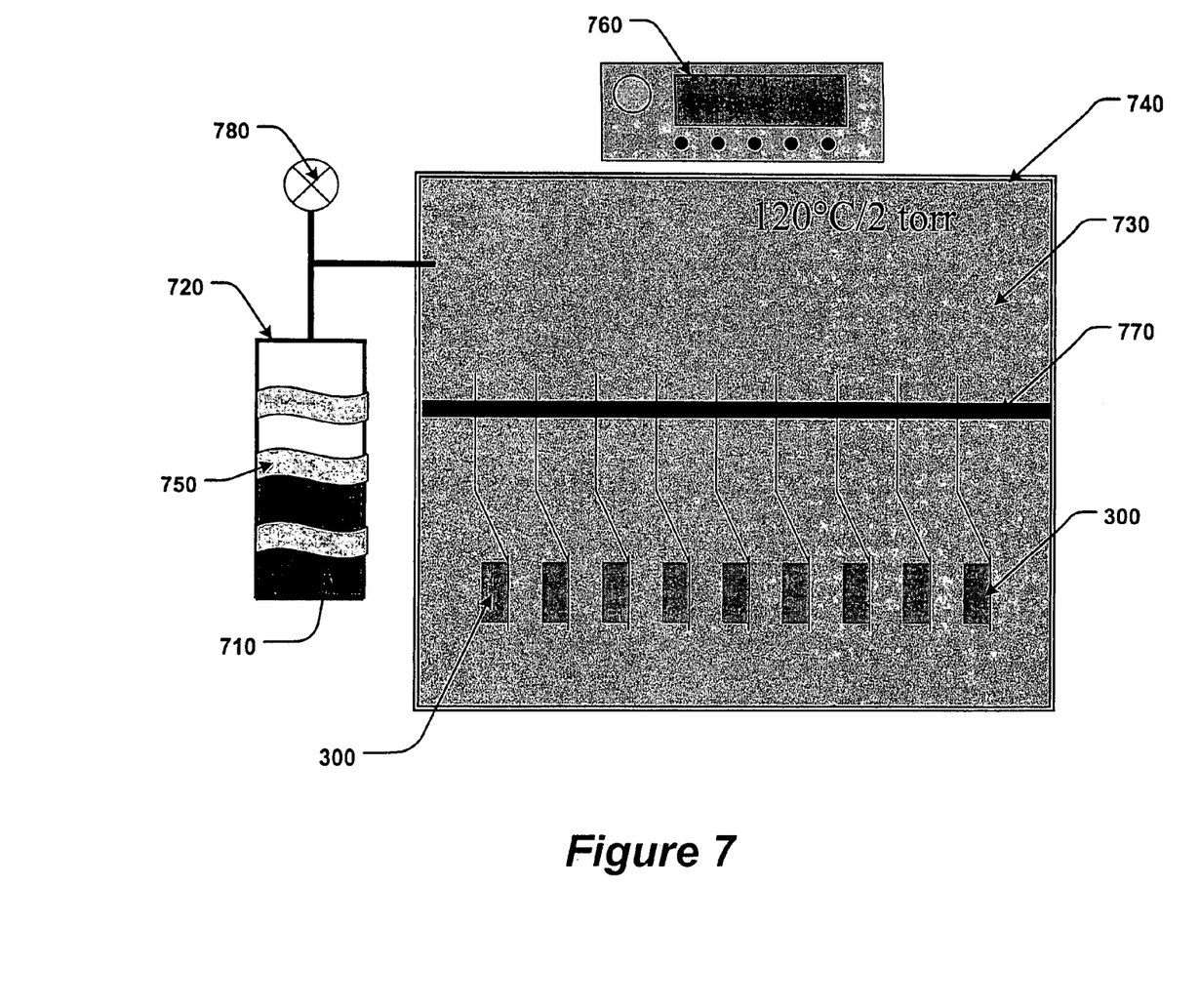
FIG. 7 provides a schematic diagram of a system for coating magnetic heads with monolayer materials in a vapor process according to an embodiment of the present invention.

In another embodiment of the present invention, a vacuum coating process for applying the monolayer surface coating to the magnetic head is provided and illustrated in the flowchart of FIG. 6 using the system of FIG. 7. The process starts (Block 600) by filling monolayer agent 710 into a glass flask 720 (Block 610), which then provides low pressure vapor 730 of the active agent to the coating chamber 740. In this example, the monolayer agent 710 is pure (96% or greater) PFDTS in the glass flask 720, which is heated up by heating tape 750 to 100° C. to obtain higher vapor pressure. A temperature controller 760 may control the heating of the monolayer agent 710. The magnetic read/write head 300 is hung by a rack 770 in the coating chamber (Block 620). The coating chamber 740 is cleaned first by pumping down to a low vacuum level and backfilling nitrogen gas for a few cycles to remove residual moisture (Block 630). The magnetic read/write head 300 is then exposed to the vapor 730 of the monolayer agent for 30 minutes (Block 640). After the valve 780 for active agent is closed, the coating chamber 740 is cleaned again by pumping down to low vacuum and backfilling with nitrogen gas for a few cycles to remove excess coating and byproducts (Block 650). The magnetic read/write head 300 is removed from the chamber 740 (Block 660), ending the process (Block 670). The length of time varies depending on requirements for chamber cleanliness and coating quality. In one embodiment, the chamber temperature was 105 degrees Celsius. However, monolayer coating has been successfully deposited on the substrate in a wide range of temperatures between 20° C. to 250° C.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A method, comprising:
   manufacturing a magnetic read/write head for a disk drive;
   partially covering the magnetic read/write head with a diamond-like carbon coating; and
   at least partially covering the magnetic read/write head with a monolayer surface coating, wherein the surface of the diamond-like carbon coating and the surface of the monolayer surface are non-uniform and non-continuous.

2. The method of claim 1, wherein the diamond-like carbon coating is less than 50 angstroms in thickness.

3. The method of claim 1, wherein the monolayer surface coating and the diamond-like carbon coating cover a disk interface location of the magnetic head.

4. The method of claim 3, wherein the monolayer surface coating covers each portion of the interface location left uncovered by the diamond-like carbon coating.

5. The method of claim 1, wherein the monolayer surface coating is applied by a liquid process.

6. The method of claim 5, wherein the liquid process includes:
- dissolving a monolayer agent in a solvent producing a resulting solution;
- immersing the magnetic read/write head in the solution;
- removing the magnetic read/write head from the solution; and
- cleaning excessive coating materials and coating conditioning from the magnetic read/write head.

7. The method of claim 1, wherein the monolayer surface coating is applied by a vacuum coating process.

8. The method of claim 7, wherein the vacuum coating process includes:
- loading a monolayer agent container into a coating chamber;
- placing the magnetic read/write head into the coating chamber;
- purging the coating chamber with nitrogen gas;
- pumping the coating chamber down to low vacuum;
- exposing the magnetic read/write head to a vapor of the agent monolayer;
- purging the coating chamber with nitrogen gas;
- pumping the coating chamber down to low vacuum; and
- removing the magnetic read/write head from the coating chamber.

* * * * *